(12) United States Patent
Miller

(10) Patent No.: US 11,568,045 B2
(45) Date of Patent: Jan. 31, 2023

(54) COMMUNICATING AN EVENT TO A REMOTE ENTITY

(71) Applicant: Raytheon Company, Waltham, MA (US)

(72) Inventor: Kenneth V. Miller, Fullerton, CA (US)

(73) Assignee: RAYTHEON COMPANY, Waltham, MA (US)

( * ) Notice: Subject to any disclaimer, the term of this patent is extended or adjusted under 35 U.S.C. 154(b) by 394 days.

(21) Appl. No.: 16/744,789

(22) Filed: Jan. 16, 2020

(65) Prior Publication Data

US 2021/0224384 A1    Jul. 22, 2021

(51) Int. Cl.
  *G06F 1/32* (2019.01)
  *G06F 21/55* (2013.01)
  *G06F 1/3206* (2019.01)
  *G06F 1/3296* (2019.01)
  *G06F 9/38* (2018.01)

(52) U.S. Cl.
  CPC .......... *G06F 21/554* (2013.01); *G06F 1/3206* (2013.01); *G06F 1/3296* (2013.01); *G06F 9/3836* (2013.01); *G06F 9/3877* (2013.01)

(58) Field of Classification Search
  CPC .... G06F 21/554; G06F 1/3206; G06F 1/3296; G06F 9/3836; G06F 9/3877
  See application file for complete search history.

(56) References Cited

U.S. PATENT DOCUMENTS

| | | | |
|---|---|---|---|
| 7,142,819 B1 * | 11/2006 | Kang | H03F 3/2173 |
| | | | 332/107 |
| 2013/0076119 A1 | 3/2013 | Yogeeswaran et al. | |
| 2018/0226875 A1 | 8/2018 | Curtis | |
| 2019/0104138 A1 * | 4/2019 | Storms | H04L 63/1416 |
| 2022/0094710 A1 * | 3/2022 | Riahi Manesh | H04L 63/1425 |

FOREIGN PATENT DOCUMENTS

| | | | | |
|---|---|---|---|---|
| GB | 2439134 A | * | 12/2007 | H02M 1/44 |
| WO | 2017/158593 A1 | | 9/2017 | |

OTHER PUBLICATIONS

Shekari et al., "RFDIDS: Radio Frequency-based Distributed Intrusion Detection System for the Power Grid", Network and Distributed Systems Security (NDSS) Symposium, Feb. 24-27, 2019, San Diego, CA, USA.

(Continued)

*Primary Examiner* — Zahid Choudhury
(74) *Attorney, Agent, or Firm* — Burns & Levinson, LLP; Joseph M. Maraia

(57) ABSTRACT

An example method includes detecting an event in an electronic system. The electronic system includes an electronic component and a switched mode power supply. The electronic component draws an amount of power from the switched mode power supply during operation. In response to detecting the event, the electronic component is operated to cause the electronic component to change the amount of power that the electronic component draws from the switched mode power supply. The change in the amount of power that the electronic component draws causes the switched mode power supply to output a signal that is evidence of the event.

22 Claims, 4 Drawing Sheets

(56) References Cited

OTHER PUBLICATIONS

Wei et al., "Using Power-Anomalies to Counter Evasive Micro-Architectural Attacks in Embedded Systems," IEEE, May 2019.
Priyadarshini et al., "Detection and Reduction of EMI Noises in as EMC Complied SMPS as per IEC/CISPR Standards," Rajalakshmi Institute of Technology (India), Oct. 2017.
"Electromagnetic Compatibility Considerations for Switching Power Supplies," CUI Inc., https://www.cui.com/catalog/resource/emi-considerations-for-switching-power-supplies.pdf.
Alfred Hesener (Fairchild Semiconductor), "Electromagnetic Interference (EMI) in Power Supplies," https://www.emcfastpass.com/wp-content/uploads/2017/04/Electromagnetic-Interference-EMI-in-Power-Supplies.pdf.
Schnabel, "The 13-step EMI mitigation program for switching power supplies," EE News Analog, Dec. 2013.
International Search Report and Written Opinion from corresponding PCT Application No. PCT/US2020/065056, dated Apr. 6, 2021.
Guri et al., "PowerHammer: Exfiltrating Data from Air-Gapped Computers through Power Lines," Ben-Gurion University of the Negev, Israel, Cyber-Security Research Center, Department of Software and Information Systems Engineering, arXiv:1804.04014v1 [cs.CR] Apr. 10, 2018, 15 pages.
International Preliminary Report on Patentability for International Patent Application No. PCT/US2020/065056, dated Jul. 19, 2022, (7 pages).

\* cited by examiner

COMMUNICATING AN EVENT TO A REMOTE ENTITY

TECHNICAL FIELD

The disclosure relates generally to communicating to a remote entity that an event such as a cyberattack has occurred in an electronic system.

BACKGROUND

An electronic system may include a switched mode power supply. An example switched mode power supply includes circuitry configured to receive input power and to convert the input power to a desired output power. For example, a switched mode power supply may convert alternating current (AC) power to direct current (DC) power, DC power to AC power, AC power to AC power, or DC power to DC power. In an example architecture, a switching element activates and deactivates a current supply to a capacitor. The resulting switched current at the capacitor generates a desired voltage output to a load.

SUMMARY

An example method includes detecting an event in an electronic system. The electronic system includes an electronic component and a switched mode power supply. The electronic component draws an amount of power from the switched mode power supply during operation. In response to detecting the event, the electronic component is operated to cause the electronic component to change the amount of power that the electronic component draws from the switched mode power supply. The change in the amount of power that the electronic component draws causes the switched mode power supply to output a signal that is evidence of the event. The example method may include one or more of the following features, either alone or in combination.

In the example method, the event may include a cyberattack. In the example method, the electronic component may include a graphics processing unit (GPU. Operating the electronic component may include controlling the GPU to execute instructions that increase a utilization of the GPU relative to a utilization of the GPU that existed prior to detecting the event.

In the example method, the signal may include noise. The switched mode power supply may change a characteristic of the noise in response to the change in the amount of power that the electronic component draws. The change in the characteristic can be indicative of the event.

In the example method, the signal may be based on a change in a frequency of a switching element in the switched mode power supply. The signal may be output over a power line. The signal may be output wirelessly.

An example system includes an electronic component having an operation that is controllable and a switched mode power supply to supply power to at least part of the electronic system including the electronic component. The electronic component is configured to draw an amount of power from the switched mode power supply that is based on an operation of the electronic component. One or more processing devices execute instructions to perform operations that include detecting an event in the electronic system; and in response to detecting the event, controlling the operation of the electronic component to cause the electronic component to change the amount of power that the electronic component draws from the switched mode power supply. The change in the amount of power that the electronic component draws causes the switched mode power supply to output a signal that is evidence of the event. The example system may include one or more of the following features, either alone or in combination.

In the example system, the event may include a cyberattack. In the example system, controlling the operation of the electronic component may include causing the electronic component to execute instructions that increase a utilization of the electronic component relative to a utilization of the electronic component that existed prior to detecting the event. In the example system, the signal may include noise produced by the switched mode power supply.

The example system may include a power line connected to the electronic system, where the signal is output over the power line. In the example system, the electronic component may include a graphics processing unit (GPU). In the example system, the noise can be transmitted to a computing system wirelessly.

In the example system, the switched mode power supply may be configured to change a characteristic of the noise in response to the change in the amount of power that the electronic component draws. The change in the characteristic may be indicative of the event. In the example system, the characteristic of the noise may include a frequency of a switching element in the switched mode power supply. In the example system, the change of the characteristic of the noise may occur in a first duration of time and the change in the amount of power that the electronic components draws may occur in a second duration of time. In the example system, the first duration may be the same as the second duration.

In the example system, the operations may include controlling the operation of the electronic component to cause fluctuations in the amount of power that the electronic component draws from the switched mode power supply. The fluctuations may represent the information. In the example system, the information may include at least one of a serial number of the electronic system, a media access control (MAC) address of the electronic system, a type of the event, a date of the event, and a time of the event.

An example racked-based example system includes multiple computing devices. Each of the multiple computing devices includes an electronic component having an operation that is controllable and a switched mode power supply to supply power to at least part of the electronic system including the electronic component. The electronic component is configured to draw an amount of power from the switched mode power supply that is based on an operation of the electronic component. One or more processing devices execute instructions to perform operations including detecting an event in the electronic system; and in response to detecting the event, controlling the operation of the electronic component to cause the electronic component to change the amount of power that the electronic component draws from the switched mode power supply. The change in the amount of power that the electronic component draws causes the switched mode power supply to output a signal that is evidence of the event. For a computing device of the multiple computing devices, the signal output can be within a unique range of noise generated by a switched mode power supply for the computing device.

Any two or more of the features described in this specification, including in this summary section, may be combined to form implementations not specifically described in this specification.

All or part of the processes, methods, systems, and techniques described herein may be implemented as a computer program product that includes instructions that are stored on one or more non-transitory machine-readable storage media, and that are executable on one or more processing devices. Examples of non-transitory machine-readable storage media include, e.g., read-only memory, an optical disk drive, memory disk drive, random access memory, and the like. All or part of the processes, methods, systems, and techniques described herein may be implemented as an apparatus, method, or system that includes one or more processing devices and memory storing instructions that are executable by the one or more processing devices to perform the stated operations.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

Figure 1:
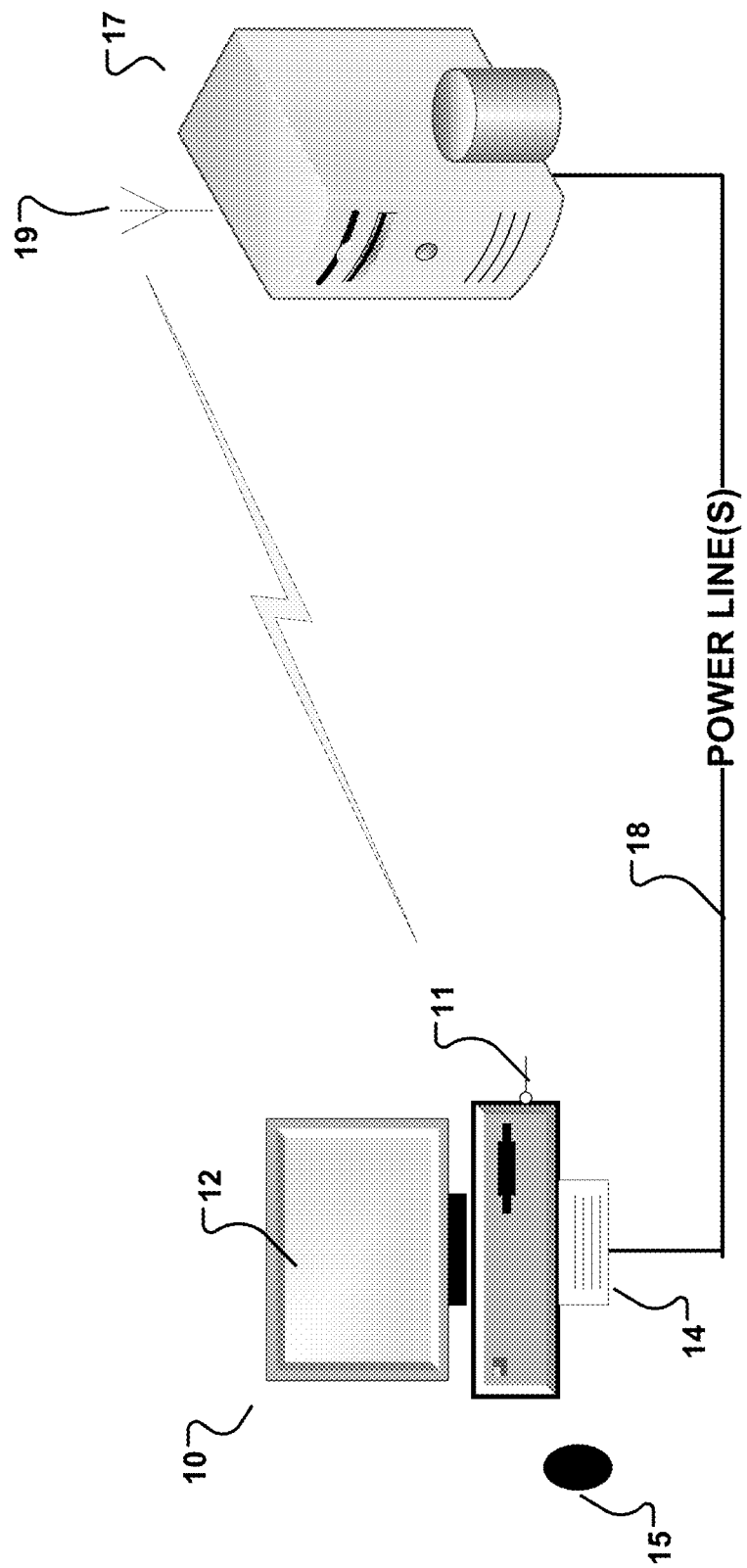
FIG. 1 is a block diagram of an example system for detecting an event and for signaling detection of the event to a remote system.

A computing system is an example of an electronic system that may be vulnerable to cyberattacks. A cyberattack may include a malware attack, for example. Malware includes malicious software that is installed on the computing system. Malware may perform various nefarious activities on the computing system. For example, the malware may expose confidential information or relay that confidential information to a remote system. In another example, ransomware, which is a type of malware, may encrypt data on the computing system and extort money from the computer's user to decrypt the data. In still another example, malware may configure the computing system to operate as part of a bot network. For example, a computing system may be configured by malware to act as a bot to mine bitcoin for a third party.

Technologies are available for detecting cyberattacks in electronic systems, including in computing systems. For example, a computing system may include software that monitors activities in the computing system, such as file access. In this example, the software may be configured to perform a check each time a user or a program attempts to access the computer's file system. The check may determine whether the user or the program is authorized to make that access. If there is no such authorization, the access may be deemed a cyber intrusion—a type of cyberattack.

After a cyberattack or other event is detected in a computing system, a notification may be sent to a remote entity, such as another computing system on a network. The notification may signal the occurrence of the cyberattack and, in some cases, provide other relevant information such as the media access control (MAC) address of the computing system under attack. Sending the notification over a communication port, such as an Ethernet port or a universal serial bus (USB) port, can alert the attacker—which may be a computer program or other entity—that the attack has been detected. In response, the attacker can modify their attack strategy or attempt to mask subsequent attacks. This cycle of detecting attacks and modifying attack strategy can persist indefinitely, making the computer system effectively unusable.

Accordingly, example techniques are described herein for covertly communicating, to a remote entity, that an event such as a cyberattack has occurred in an electronic system. In some implementations, the techniques include changing operation of one or more components of the computing system in response to detection of a cyberattack in a way that is not readily detectable by the attacker. For example, a switched mode power supply generates radio frequency (RF) noise signals during its operation. This noise is generated, at least in part, by a switching element in the power supply and may vary with the frequency of operation of the switching element. Accordingly, when the power supply changes its power output, the noise output frequency also changes. That change in noise frequency is detectable by remote entities, using either a radio system tuned to the frequency of that systems switching power supply, or via a radio frequency sensing system connected to the power supply AC input by a remote computing devices. Therefore, in some implementations, to communicate that an event such as a cyberattack has occurred in a computing system, the switched mode power supply may be operated to increase its power output for a period of time. This produces a change in the noise signal generated by the power supply. That change may be detected by a remote system, as noted above and interpreted as evidence of a cyberattack in the computing system. In some examples, the noise signal is not transmitted over a communication port and is subtle enough to prevent an attacker from realizing that the generated noise signal is actually a communication notifying that there has been a cyberattack.

In an example, an electronic component of the computing system, such as a graphics processing unit (GPU) or central processing unit (CPU), may be operated to affect the operation of the switched mode power supply in the manner described in the preceding paragraph. For example, the GPU or the CPU may be operated to draw an increased amount of power from the switched mode power supply to cause the change in the noise signal generated by the switched mode power supply. In an example, in response to detecting a cyberattack, the GPU may be operated to change—for example, to increase—the amount of current that the GPU draws from the switched mode power supply. Power is the product of voltage and current; therefore, an increase in current results in an increase in power. Accordingly, this change in the amount of current that the GPU draws causes the switched mode power supply to output a changed frequency of the noise signal that may be interpreted as evidence of the cyberattack. The frequency of the noise signal that is output under these circumstances may be outside the normal frequency range of noise produced by the switched mode power supply. This change may be in both frequency and amplitude. Other types of changes may also be used as described below.

FIG. 1 shows an example of a computing system 10 that is configured to implement the techniques described herein. Computing system 10 includes a network interface 11, such as an Ethernet port, for interfacing to a network, such as the Internet. Computing system 10 also includes display screen 12 for displaying information to a user, a keyboard 14 for inputting text and user commands, and a mouse 15 for positioning a cursor on display screen 12 and for inputting user commands. A remote system 17, which may be another computing system, is configured so that it can detect and/or receive information about noise emitted from computing system 10. The computer system 17 may have a receiver 19, e.g., radio receiver, to receive and/or monitor the change in noise frequency. In some implementations, computing system 10 and remote 17 may receive power from one or more common power lines 18. In some implementations, computing system 10 and remote system 17 do not receive power from one or more common power lines.

Figure 2:
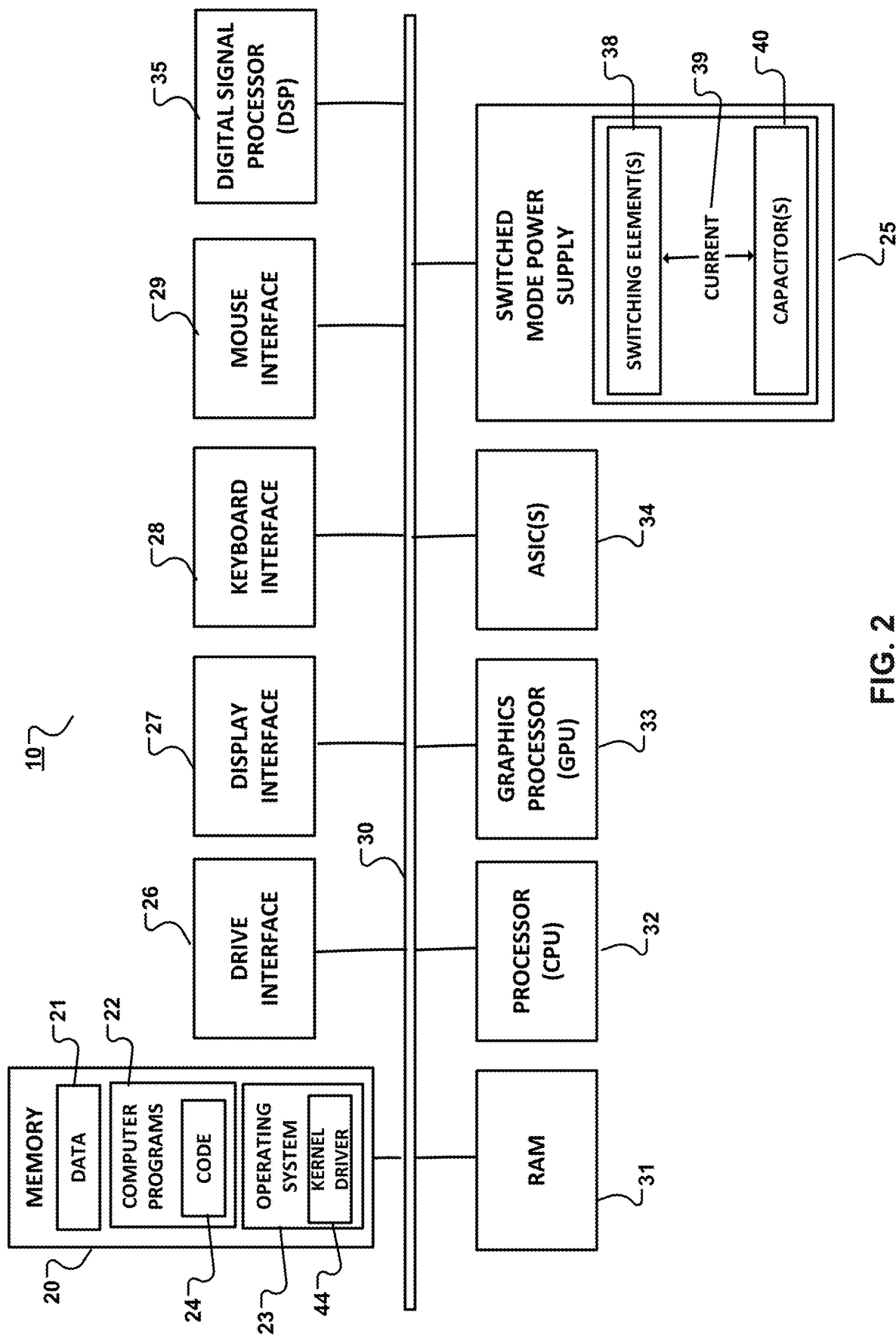
FIG. 2 is a block diagram of an example computing system containing components that are controllable to operate a switched mode power supply to signal detection of an event to a remote system.

FIG. 2 shows examples of components that may be included in computing system 10. As shown in FIG. 2, computing system 10 includes memory 20, which may include a non-transitory computer-readable medium such as a computer hard disk. Memory 20 stores data 21, computer programs 22, and operating system 23, among other things. Among the computer programs stored in memory 20 is computer code 24 that is executable in response to detecting a cyberattack to change the operation of one or more components of the computing system in order to increase their current draw from switched mode power supply 25. Also included in computing system 10 are drive interface 26, display interface 27, keyboard interface 28, mouse interface 29, one or more computer buses 30, random access memory (RAM) 31, processor (CPU) 32, and GPU 33.

Processor 32 may be a microprocessor, programmable logic, or the like for executing computer programs, such those noted above, out of RAM 31. Processor 32 accesses computer programs (or other data) stored on an external device via drive interface 26. GPU 33 is a type of processing device. For example, the GPU may be a programmable logic chip that is configured to implement and to control display functionality. To this end, the GPU may be programmed to render images, animation, and video on the computer's screen. The GPU may be located on a plug-in card or in a chipset on the motherboard of the computing system, or the GPU may be in the same physical chip as the CPU. In some implementations, the GPU uses its own, direct connection to the switched mode power supply. As a result, the GPU may be a candidate for drawing current from the switched mode power supply in order to change the noise generated by the power supply. For example, as described subsequently, the GPU is also capable of executing computer programs that do not relate to display functionality. As described below, one or more of these programs may be executed to cause the GPU to draw additional current from the switched mode power supply in response to a cyberattack in order to change the noise frequency generated by the power supply.

Computing system 10 may also include one or more application-specific integrated circuits (ASIC) 34 that are custom-designed to implement specific functions such as capturing images or recording video. The ASICs may also be capable of executing computer programs that do not relate to their primary functions. The computing system may also include a digital signal processor (DSP) 25 to convert analog signals into digital signals. The DSP may also be operated to improve the quality of incoming signals. The DSP may also be capable of executing computer programs that do not relate to signal processing. As described below, one or more programs may be executed to cause the DSP or an ASIC to draw additional current from the switched mode power supply in response to a cyberattack in order to change the noise frequency generated by the switched mode power supply. In some implementations, multiple electronic components, such as the GPU, the CPU, an ASIC, and/or a DSP, may execute one or more computer programs concurrently, contemporaneously, or simultaneously in order to draw additional current from the switched mode power supply in response to a cyberattack and thereby change the noise frequency generated by the power supply. In some implementations, the GPU may contain multiple components of each type shown in FIG. 2; for example, multiple CPUs, multiple GPUs, multiple DSPs, and so forth. One or more of each type of component may be configured to execute one or more computer programs concurrently, contemporaneously, or simultaneously in order to draw additional current from the switched mode power supply in response to a cyberattack and thereby change the noise frequency generated by the power supply.

Computing system 10 also includes the switched mode power supply 25. Switched mode power supply 25 may be configured to provide power to the components of the computing system shown in FIG. 2. As explained previously, an example switched mode power supply includes circuitry that is configured to receive input power and to convert that input power to a desired output power. In the case of a computing system, the switched mode power supply is typically configured to provide DC power to various electronic components. Examples of switched mode power supplies include, but are not limited to, a DC-to-DC voltage converter, a forward converter, a flyback converter, a self-oscillating flyback converter, a buck converter, and a boost converter.

In example switched mode power supply 25, one or more series switching elements 38 activates and deactivates current supply to supply current 39 to one or more capacitors 40, such as a capacitor bank. The resulting switched current at the capacitor generates a desired voltage output to a load. In some implementations, the switched mode power supply may include one or more series inductors and capacitors. In these examples, operation of transistor-based switching elements is controlled to control the current to these passive electronic devices in order to generate a desired output voltage. In an example switched mode power supply, a switching element switches in the very low frequency (VLF) range or extremely low frequency (ELF) range. Under some definitions, the VLF/ELF range is 3 Hertz (H) to 30H. Under some definitions the VLF/ELF range is 20 kilohertz (KHz) to 2 megahertz (MHz).

An example switched mode power supply—a buck converter—includes a transformer having a primary winding, a first secondary winding and a second secondary winding; a first transistor connected between a first terminal of the first secondary winding and electrical ground; a second transistor connected between a second terminal of the second secondary winding and electrical ground; an inductor connected to a center tap of the transformer between the first secondary winding and the second secondary winding; and a capacitor that is connectable via at least one of the first transistor or the second transistor along a current path to the transformer that includes the inductor. A control system generates pulse-width modulated control signals to control operation of the first transistor and the second transistor to regulate an output voltage across the capacitor based on an input voltage at the primary winding.

The techniques described herein are not limited to use with the preceding types of switched mode power supplies. The techniques may be used to control the noise frequency output of any appropriate type of switched mode power supply.

Figure 3:
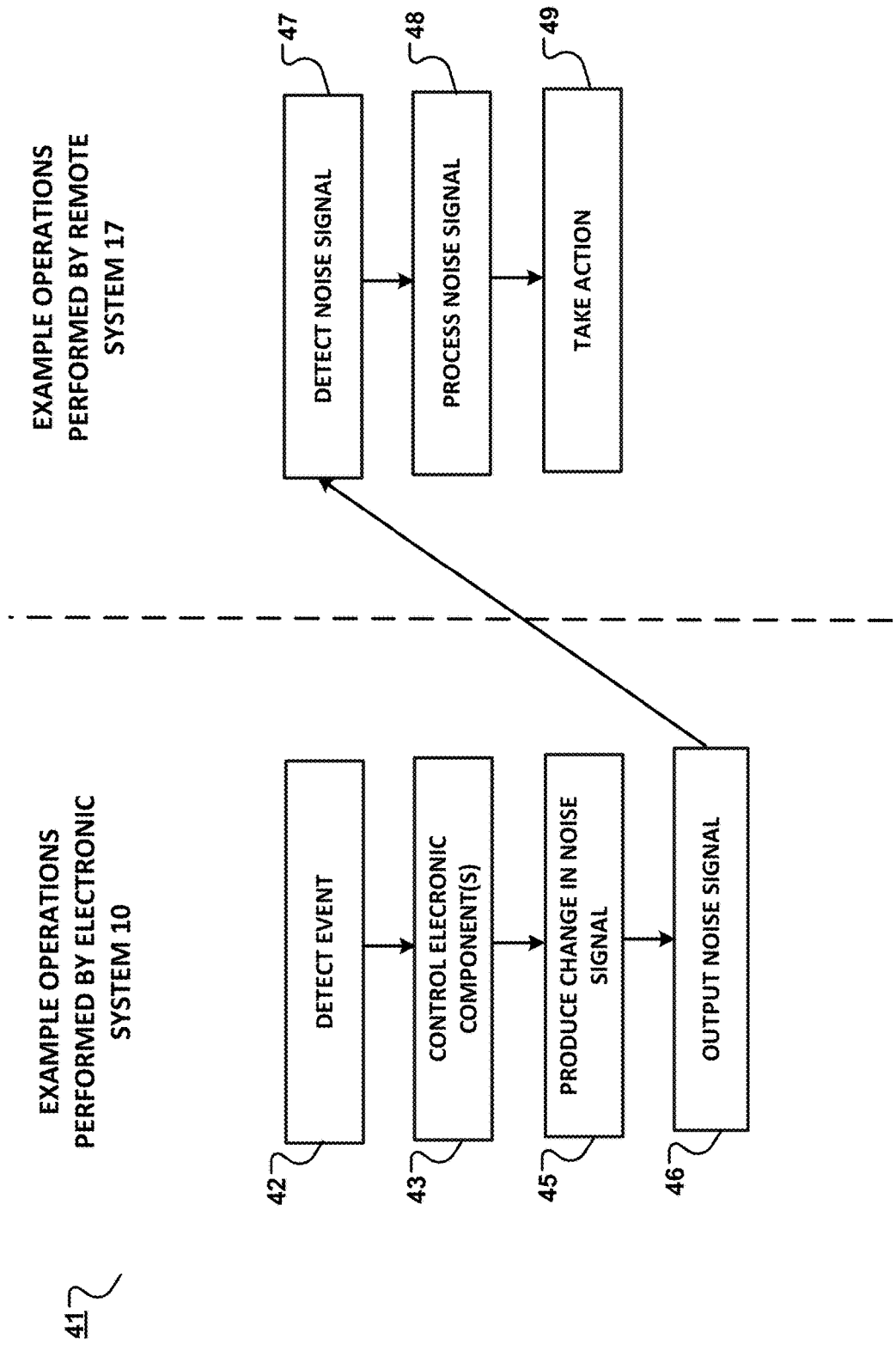
FIG. 3 is a flowchart showing an example process for communicating to a remote entity that an event such as a cyberattack has occurred in an electronic system.

FIG. 3 shows operations included in an example process 41 for communicating, to a remote entity, that an event such as a cyberattack has occurred in an electronic system. The operations may be implemented using computer-executable instructions stored on one or more non-transitory machine-readable storage media. The instructions may be executed by one or more processing devices, such as the CPU or the GPU described previously, to implement the operations.

Process 41 incudes detecting (42) an event in an electronic system that includes an electronic component and a switched mode power supply. For example, the electronic system may be or include a computing system as described previously, multiple computers on a computer network, a mobile computing device, or any other appropriate type of system. The event may be or include a cyberattack or any other appropriate type of event. An example of another type of event that may be detected includes unauthorized actions taken by a user of the electronic system. The user may be an unauthorized user or an authorized user having limited permissions. An example of another type of event that may be detected includes a component failure in the computing system. For example, one or more components of the computing system—such as one or more communication ports or drivers therefor—may fail in a way that prevents or limits communication of the failure outside of the system. An example of another type of event includes co-opting a computing system to mine bitcoin.

In response to detection of an event (42) such as a cyberattack, one or more electronic components of the computing system are controlled (43) to draw additional current from the switched mode power supply. For example, an electronic component may be instructed to execute one or more computer programs that cause the component to consume additional power. In an example, a monitoring program may detect a cyber intrusion in to the computing system. In response to detecting the event, the monitoring program, the CPU, or any other appropriate entity in the computing system instructs the GPU to execute a computer program. The computer program may be a computationally-intensive program that causes the GPU to increase its utilization relative to a utilization of the GPU that existed prior to detecting the event and thereby change the amount of power that the GPU draws from the switched mode power supply. For example, execution of the computer program may cause the GPU to draw additional current from the switched mode power supply for a predefined amount of time. In an example, the computer program may compute the value of Pi to one hundred thousand digits. Although the GPU is used in this example, the GPU, the DSP, the CPU, an ASIC, and/or any appropriate one or more other components of the computing system shown in FIG. 2, for example, may be controlled alone or in any appropriate combination to increase their current draw from the switched mode power supply for a predefined amount of time. In some examples, other methods of control may be used. For example, instead of causing a component to execute a computer program, the component may be executed at full power—for example, outside of a sleep mode—for an extended period of time. This too may cause an increase in the component's current draw for a time.

In some implementations, the GPU may be controlled by creating a low level kernel driver 44 in the computing system's operating system 23, as shown in FIG. 2. This driver causes the GPU to invoke a function, such as a Fourier transform. When instantiated, the driver loads a program into the GPU that causes the GPU to cycle while performing the Fourier transform. This will cause the GPU to draw additional current from the switched mode power supply. To meet this additional current need, the switched mode power supply will change the frequency of one or more of the switching elements contained in the switched mode power supply. This produces a change in the noise signal frequency that is detectable by the remote system. After a receiver in the remote system detects that the frequency of the noise has changed, and changed according to a particular pattern and/or for a specified duration, then the remote system may send an appropriate message regarding an event detected in the computing system In some implementations, one or more components of the electronic system may be controlled to draw less, or no, power. For example, a component that is normally active may be shut down for a period of time, thereby causing the component not to draw any current. Such a change will likewise affect the noise produced by the switched mode power supply as described herein.

The change in the amount of current drawn by the GPU (in this example), produces a change (45) in the noise signal produced by the switched mode power supply. For example, as explained above, to provide the increased current, the switching frequency of a switching element—for example one or more transistors—in the switched mode power supply changes, thereby causing a change in the noise produced by the switched mode power supply. For example, in response to the change in the switching frequency and thus the current output, one or more of the following may occur: the noise signal produced by the switched mode power supply may increase in frequency; the noise signal produced by the switched mode power supply may decrease in frequency; the noise signal produced by the switched mode power supply may increase in amplitude; or the noise signal produced by the switched mode power supply may decrease in amplitude. In some examples, a switched mode power supply emits noise in the range of 50 kilohertz (KHz) to 2 megahertz (2 MHz); accordingly, the change in frequency may be in this range. However, the system is not limited to using noise frequencies in this range.

In some implementations, the change in the noise produced may persist for the same duration as the change in the current output. In some implementations, the change in the noise produced may persist for a longer duration than the change in the current output. In some implementations, the change in the noise produced may persist for a shorter duration than the change in the current output. In some implementations, each electronic component produces their own, unique change in noise in response to a change in current output. For example, different instances of the same type of switched mode power supply may produce a different change in noise in response to the same change in current output. In this example, an instance of a switched mode power supply includes a unique specimen of the switched mode power supply that is differentiated from other specimens of the switched mode power supply. For example, an instance of a switched mode power supply may have a serial number that distinguishes it from all other switched mode power supplies, including those that are the same make and model. Different types of information may be used to identify an instance of a switched mode power supply.

The noise signal produced by the switched mode power supply is output (46) from the electronic system—the computing system, in this example. In some implementations, the noise signal may be output wirelessly. For example, the noise signal may radiate from the switched mode power supply into the surrounding environment, that is, the air. This eliminates the need for transmission over a communication interface that may be detected by a third party. In some implementations, the noise signal may be output over a wired connection. For example, the noise signal may be transmitted over a power line to the electronic system. In some examples, the power line is connected directly or indirectly to the switched mode power supply. As a result, the noise signal produced by the switched mode power supply will be picked-up by the power line and propagate over the power line. Accordingly, in some implementations, no other electronic circuitry is required for transmission of the noise signal over the power line. As a result, there is less likelihood that the transmission of the noise signal will be detected by a third party. That is, in both the wired and wireless cases, the noise signal may be viewed as a by-product of the power supply's normal operation and, in all likelihood, will not be recognized as a transmission, particularly when no specialized circuitry or conduits used to implement the transmission.

The noise signal is produced and output from the electronic system for a period of time. The period of time may be an indication to a remote system that the noise signal is evidence of an event, such as a cyberattack. In some implementations, the noise signal may be modulated to transmit information from the electronic system to a remote system. For example, the change in noise may be generated intermittently, periodically, or sporadically. The power drawn by the GPU, for example, may fluctuate to generate changes in noise over time. For example, the change in noise may be controlled to output a code, such as Morse code, containing information such as the serial number of the system emitting the noise, the MAC address of the system emitting the noise, the type of the event such as a cyberattack, the date and time of the event, and so forth. In an example, the change in noise may be implemented by causing the GPU or other component(s) to execute the program multiple times intermittently, periodically, or sporadically for different durations. The duration of each execution may represent an alphanumeric character or other type of information that may be transmitted as code to a remote system. In an example, the change in noise may be implemented in the computer program itself. For example, calculations in the computer program may be designed to increase the operation on the GPU so that current is drawn from the switched mode power supply intermittently, periodically, or sporadically for different durations. As above, the duration of each change in current draw, and thus change in noise, may represent an alphanumeric character or other type of information that may be transmitted as code to a remote system. The computer program may be designed to send a predefined message in this way or the computer program may be configurable by the monitoring program to send any appropriate type of message, such as those described herein, by modulating the power supply noise.

In some implementations, remote system includes a VLF receiver that is configured to listen for, and to detect (47), the noise signal emitted by the switched mode power supply. The remote system may be a computing device having the same or different configuration as the electronic system that outputs the noise signal. In some examples, the remote system may be remote in the sense that it electronically isolated from the system that emitted the noise. For example, the remote system may be on the same computer network as the system that emitted the noise, but may be behind a firewall or other security that protects it from cyberattack. In some examples, the remote system may be physically separated from the system that emitted the noise. For example, the two systems may not be on the same computer network and may not be connected electrically or mechanically. In some implementations, the remote system and the system that emitted the noise may receive power from the same external source—for example, the two systems may be connected via a common power line or lines—but otherwise may be independent of each other both electrically and mechanically. In some implementations, the remote system and the system that emitted the noise may be in sufficiently close physical proximity for the remote system to hear the noise emitted by the switched mode power supply but otherwise may be independent of each other both electrically and mechanically. For example, the distance between the two systems may be measured in single-digit meters. In some examples, the distance between the two systems may be ten meters to five hundred meters. This increase may be achievable using some techniques, such as encoding the signal synchronously with a time epoch. In some implementations, the remote system may include a noise detector that is located in close physical proximity to the system that emitted the noise signal. The noise detector may be unconnected mechanically or electrically to the computing system that emits the noise. The noise detector may detect the noise signal emitted by the switch mode power supply and relay that noise signal via an analog signal or a digital signal to a part of the remote system that processes the noise signal.

Accordingly, to detect the noise signal from the switched mode power supply, the remote system listens for the noise signal. The remote system may be configured to listen to the noise signal wirelessly or over a power line, for example. The remote system may be configured to process (48) noise that it detects to determine whether the noise is evidence of an event that occurred on the electronic system that emitted the noise. In this regard, the switched mode power supply emits noise during the normal course of its operation. The change in noise in response to an event is therefore generated so that it is outside the normal range of noise emitted from the switched mode power supply. This is done so that the remote system can distinguish event-related noise from other, normal noise. For example, the event-related noise may persist and remain constant or substantially constant for a duration that is not within the normal range of noise emitted by the switched mode power supply. For example, the event-related noise may extend to a frequency and/or for a duration that is not within the normal range of noise emitted by the switched mode power supply. For example, the event-related noise may have a predefined pattern that represents a communication code that is detectable and distinguishable from background noise.

As explained previously, each instance of the switched mode power supply has a unique noise output, or signature. The noise signature may include, for example, frequencies of noise generated, durations for which noise is generated, and/or amplitudes of noise generated. The remote system may be configured—for example, programmed—to recognize the standard noise output of a particular switched mode power supply and to identify deviations therefrom. The deviations constitute the noise signal that identifies the event. To learn the standard noise output of the switched mode power supply, the remote system may detect noise from that switched mode power supply over a period of time that encompasses multiple operational conditions of the computing system that includes the switched mode power supply. Any appropriate time period may be used—for example, days, weeks, or months. Generally, the longer the time period, the more accurate detection of the event-related noise output will be.

Knowing the standard noise output for the switched mode power supply, the remote system compares the detected noise signal to the standard noise output to identify deviations from the standard noise output. These deviations are recognized by the remote system as evidence of an event, such as a cyberattack, in the computing system containing the switched mode power supply. In some implementations, the remote system is configured to detect a deviation in frequency from the standard noise output that occurs for at least a predetermined duration.

The remote system may also be configured to identify information in the detected noise signal. For example, the remote system may be configured to identify patterns in the noise signal that represent information contained in the noise signal. Patterns in the noise signal may include, but are not limited to, changes in duration of the noise signal, changes in frequency of the noise signal, and/or change in amplitude of the noise signal. If a pattern is detected, the pattern may be interpreted to identify the information contained in the noise signal. For example, if the pattern represents Morse code, the Morse code is interpreted to identify the information. As explained previously, the information may include, but is not limited to, the serial number of the system emitting the noise, the MAC address of the system emitting the noise, the type of the event such as a cyberattack, the date and time of the event, and so forth.

In response to detecting the event, the remote system is configured to take appropriate action (49) in response to the event. For example, the remote system may notify a network administrator of an event on a networked computer. For example, the remote system may send information from the detected noise signal to a network administrator. For example, the remote system may perform operations to quarantine a computing system under cyberattack. For example, the remote system may perform operations to thwart the cyberattack and/or future cyberattacks.

Figure 4:
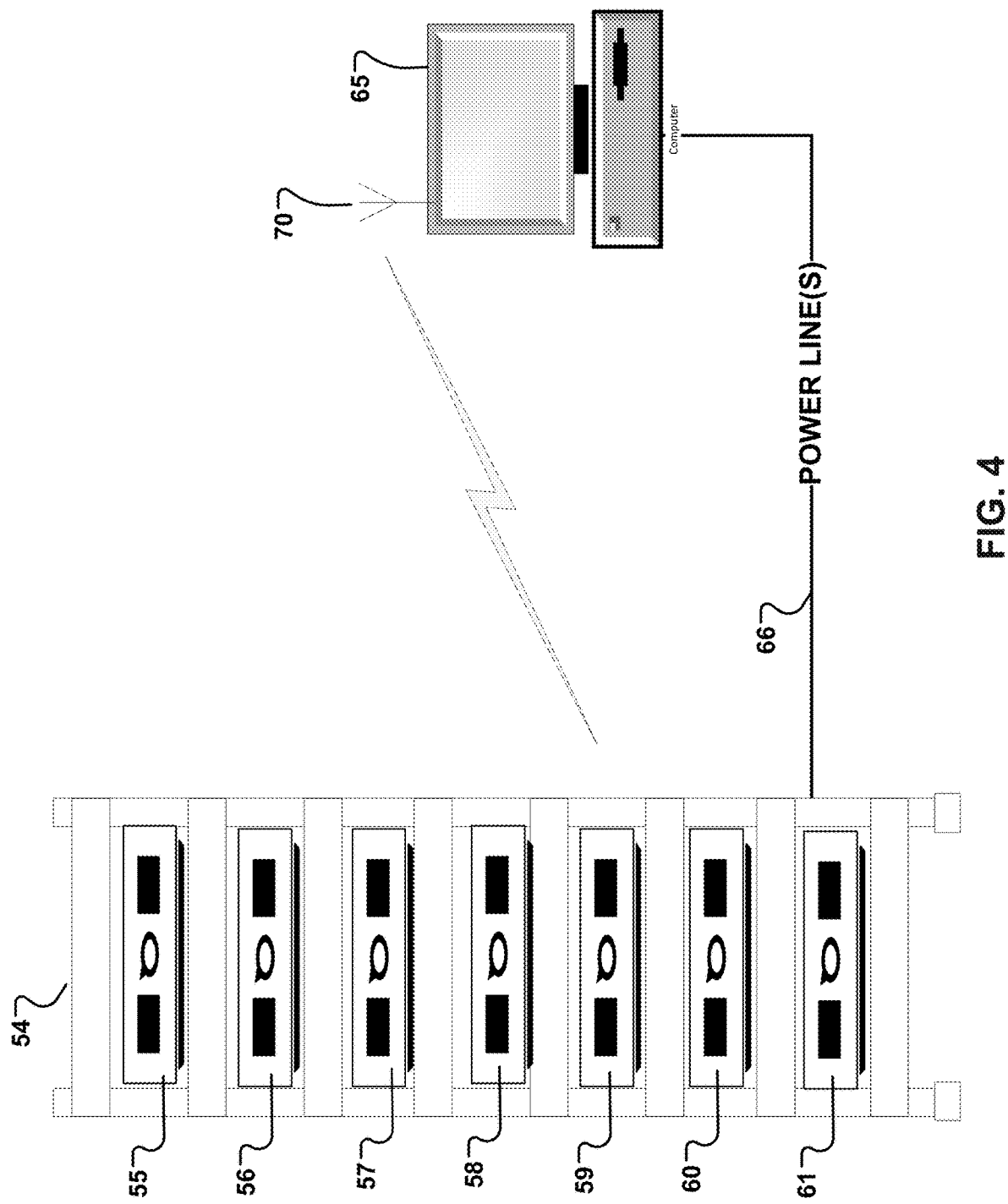
FIG. 4 is a block diagram of a rack computing system configured to communicate to a remote entity that an event such as a cyberattack has occurred in one or more computing systems in the rack.

In some implementations, the techniques described herein may be implemented using multiple computing systems in close proximity, each containing a switched mode power supply. An example where this may be the case is in a rack-based computing system. For example, referring to FIG. 4, a rack 54 may house multiple computing systems 55 to 61 that operate in concert to perform processing for multiple clients (not shown). As explained previously, each switched mode power supply has a unique noise signature. Accordingly, a remote system may be configured to learn the noise signatures of each computing system in the rack. The remote system may then be configured to identify events in individual computing systems in the rack based on noise signals output by those computing systems.

By way of example, remote system 65 may listen for the noise signatures of each of the computing systems in the rack. To this end, as explained above, remote system 65 may listen for the noise signatures using any appropriate method described herein, such as listening over power line 66 or listening wirelessly for environmental noise by the receiver 70. The remote system identifies and isolates noise output from each computing system. The remote system is also able to identify the standard noise output of each computing system. The standard noise output may be noise within the noise signature that is output most often by the computing system. For example, the standard noise output may be noise within two or three standard deviations from the mean noise output by a computing system. The remote system then continues to monitor noise emanating from the various computing systems in the rack. Because the remote system knows the noise signature of each computing system, the remote system is able to relate the various noise signals to the computing systems that produce them. When deviations from a standard noise output are detected and/or a predefined noise pattern or duration is detected (for example), the remote system registers that an event has occurred in a computing system in the rack. If the noise contains information, that information is obtained as well, as also described previously. The remote system then takes appropriate action in response to the event. Examples of appropriate action are described previously.

All or part of the processes described herein and their various modifications (hereinafter referred to as "the processes") can be implemented, at least in part, using a computer program product, e.g., a computer program tangibly embodied in one or more information carriers, e.g., in one or more tangible machine-readable storage media, for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Non-transitory machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Each computing device, such as a tablet computer, may include a hard drive for storing data and computer programs, and a processing device (e.g., a microprocessor) and memory (e.g., RAM) for executing computer programs Elements of different implementations described herein may be combined to form other implementations not specifically set forth above. Elements may be left out of the processes, computer programs, user interfaces, etc. described herein without adversely affecting their operation or the operation of the system in general. Furthermore, various separate elements may be combined into one or more individual elements to perform the functions described herein.

Various aspects of at least one implementation of the present disclosure are discussed above with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. For purposes of clarity, not every component may be labeled in every drawing. The figures are provided for the purposes of illustration and explanation and are not intended as a definition of the limits of the claims.

Other implementations not specifically described herein are also within the scope of the following claims.

What is claimed is:

1. A method performed by one or more processing devices, comprising:
    detecting an event in an electronic system, the electronic system comprising an electronic component and a switched mode power supply, the electronic component drawing an amount of power from the switched mode power supply during operation; and
    in response to detecting the event, operating the electronic component to cause the electronic component to change the amount of power that the electronic component draws from the switched mode power supply, wherein the change in the amount of power that the electronic component draws causes the switched mode power supply to output a radio frequency (RF) signal that is evidence of the event, and the RF signal having a frequency outside the normal frequency range of noise produced by the switched mode power supply.

2. The method of claim 1, wherein the event comprises a cyberattack.

3. The method of claim 1, wherein the electronic component comprises a graphics processing unit (GPU); and
    wherein operating the electronic component comprises controlling the GPU to execute instructions that increase a utilization of the CPU relative to a utilization of the GPU that existed prior to detecting the event.

4. The method of claim 1, wherein the RF signal comprises noise, the switched mode power supply changing a characteristic of the noise in response to the change in the amount of power that the electronic component draws, the change in the characteristic being indicative of the event.

5. The method of claim 1, wherein the RF signal is based on a change in a frequency of a switching element in the switched mode power supply.

6. The method of claim 1, wherein the RF signal is output over a power line.

7. The method of claim 1, wherein the RF signal is output wirelessly.

8. An electronic system comprising:
    an electronic component having an operation that is controllable;
    a switched mode power supply to supply power to at least part of the electronic system including the electronic component, the electronic component being configured to draw an amount of power from the switched mode power supply that is based on an operation of the electronic component; and
    one or more processing devices to execute instructions to perform operations comprising:
        detecting an event in the electronic system; and
        in response to detecting the event, controlling the operation Of the electronic component to cause the electronic component to change the amount of power that the electronic component draws from the switched mode power supply, where the change in the amount of power that the electronic component draws causes the switched mode power supply to output a radio frequency (RF) signal that is evidence of the event, and the RF signal having a frequency outside a normal frequency range of noise produced by the switched mode power supply.

9. The electronic system of claim 8, wherein the event comprises a cyberattack.

10. The electronic system of claim 8, wherein controlling the operation of the electronic component comprises causing the electronic component to execute instructions that increase a utilization of the electronic component relative to a utilization of the electronic component that existed prior to detecting the event.

11. The electronic system of claim 8, wherein the RF signal comprises noise produced by the switched mode power supply.

12. The electronic system of claim 8, further comprising:
    a power line connected to the electronic system, wherein the RE signal is output over the power line.

13. The electronic system of claim 8, wherein the electronic component comprises a graphics processing unit (GPU).

14. The electronic system of claim 11, wherein the noise is transmitted to a computing system wirelessly.

15. The electronic system of claim 11, wherein the switched mode power supply is configured to change a characteristic of the noise in response to the change in the amount of power that the electronic component draws, the change in the characteristic being indicative of the event.

16. The electronic system of claim 15, wherein the characteristic of the noise is based on a frequency of a switching element in the switched mode power supply.

17. The electronic system of claim 15, wherein the change of the characteristic of the noise occurs in a first duration of time and the change in the amount of power that the electronic components draws occurs in a second duration of time.

18. The electronic system of claim 17, wherein the first duration is the same as the second duration.

19. The electronic system of claim 8, wherein the operations comprise controlling operation of the electronic component to cause fluctuations in the amount of power that the electronic component draws from the switched mode power supply, the fluctuations representing information.

20. The electronic system of claim 19, wherein the information comprises at least one of a serial number of the electronic system, a media access control (MAC) address of the electronic system, a type of the event, a date of the event, or a time of the event.

21. A rack-based computing system comprising:
    multiple computing devices, each of the multiple computing devices comprising:
        an electronic component having an operation that is controllable;
        a switched mode power supply to supply power to at least part of the electronic system including the electronic component, the electronic component being configured to draw an amount of power from the switched mode power supply that is based on an operation of the electronic component; and one or more processing devices to execute instructions to peform operations comprising:

detecting an event in a computing device of the multiple computing devices; and in response to detecting the event, controlling the operation of the electronic component to cause the electronic component to change the amount of power that the electronic component draws from the switched mode power supply, where the change in the amount of power that the electronic component draws causes the switched mode power supply to output a radio frequency (RF) signal that is evidence of the event;

wherein, for the computing device of the multiple computing devices, the RF signal output is within a unique range of noise generated by a switched mode power supply for the computing device and when the event is detected, the RF signal includes a frequency outside the unique range of the noise produced by the switched mode power supply.

22. One or more non-transitory machine-readable storage media storing instructions that are executable by one or more processing devices to perform operations comprising:

detecting an event in an electronic system, the electronic system comprising an electronic component and a switched mode power supply, the electronic component drawing an amount of power from the switched mode power supply during operation; and in response to detecting the event, operating the electronic component to cause the electronic component to change the amount of power that the electronic component draws from the switched mode power supply, wherein the change in the amount of power that the electronic component draws causes the switched mode power supply to output a radio frequency (RF) signal that is evidence of the event, and the RF signal having a frequency outside a normal frequency range of noise produced by the switched mode power supply.

\* \* \* \* \*